Feb. 6, 1968 A. M. THIEL 3,367,224
ALIGNING AND POSITIONING DEVICE
Filed Dec. 1, 1965 2 Sheets-Sheet 1
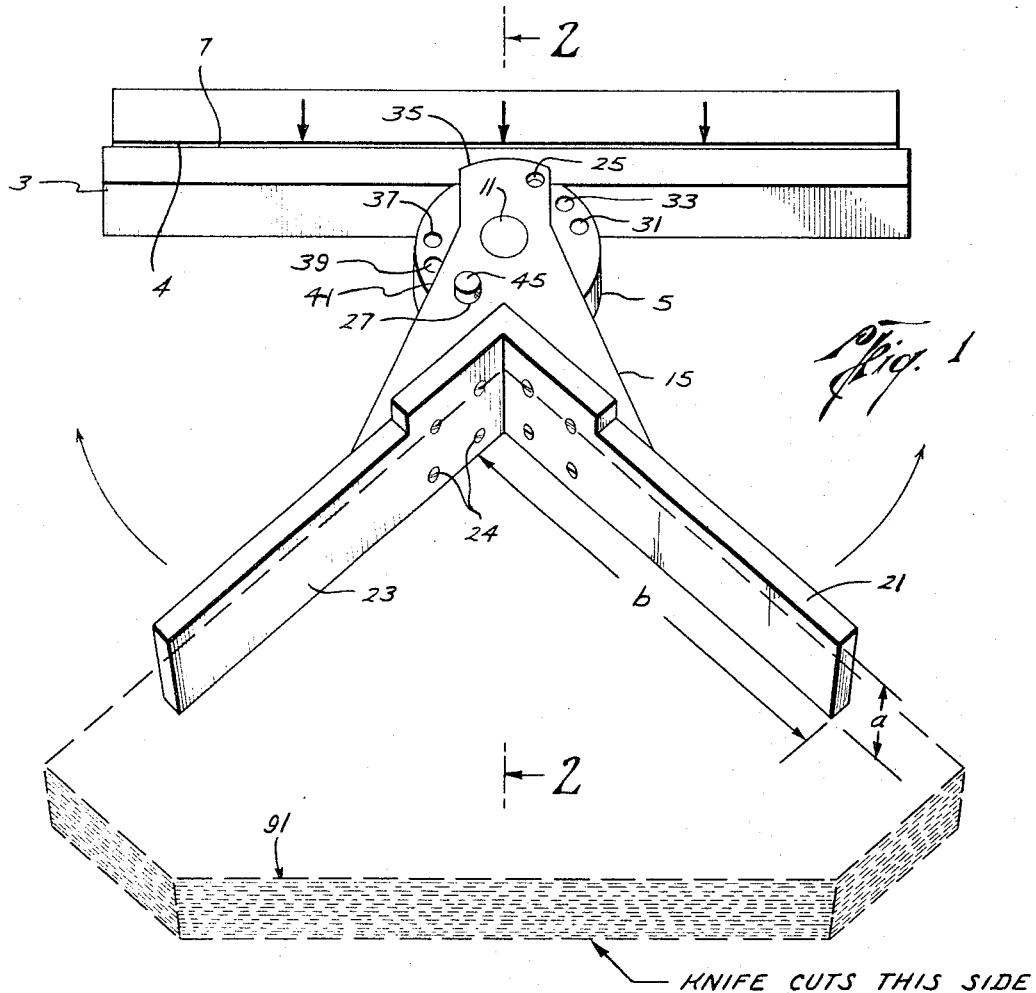
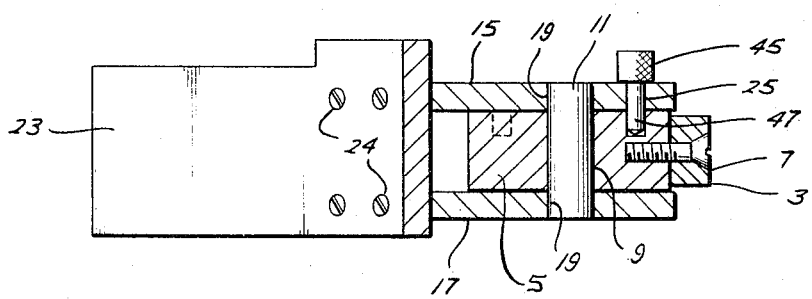
Alphonse M. Thiel
INVENTOR.
BY
ATTORNEYS

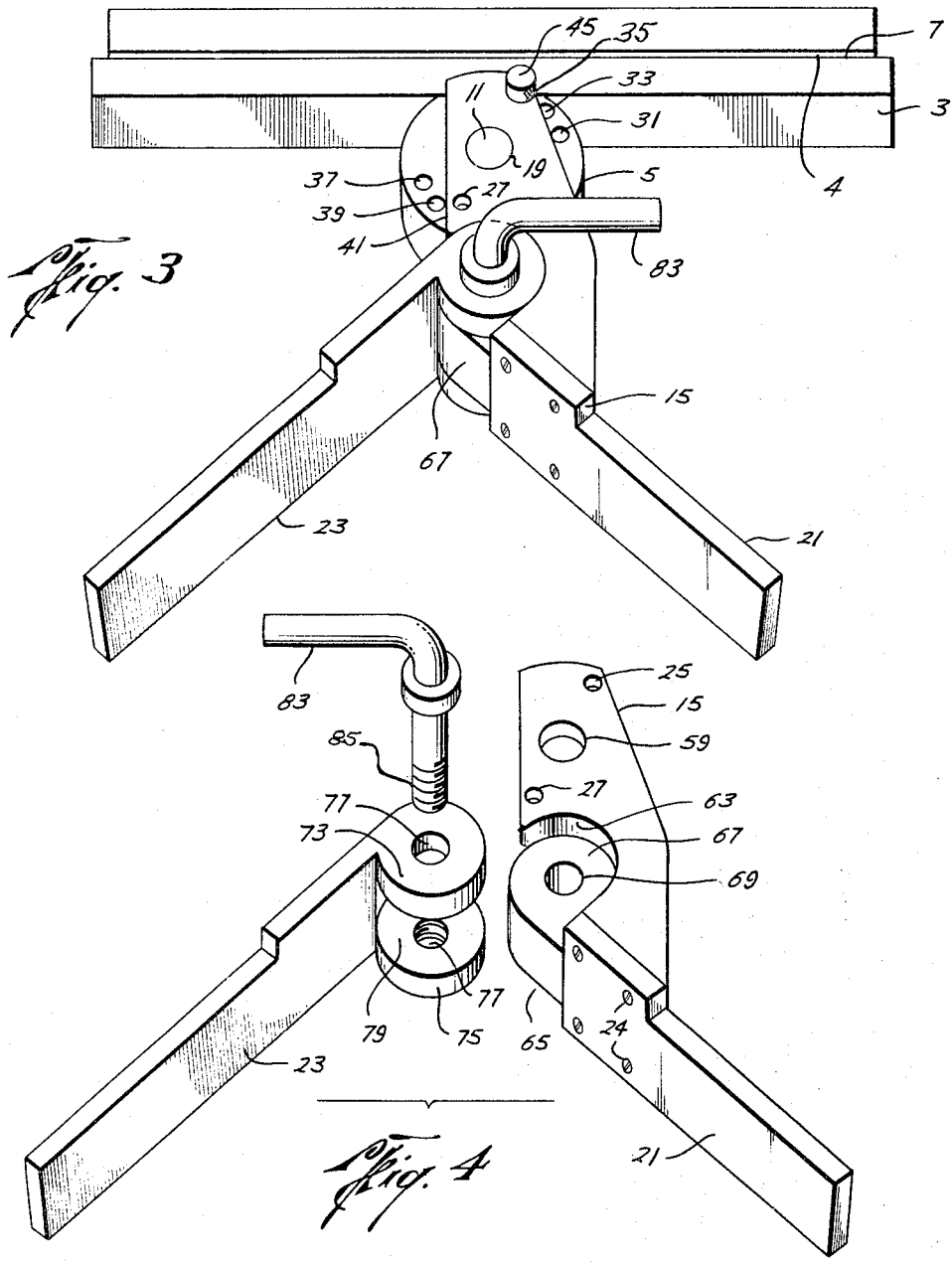

United States Patent Office 3,367,224
Patented Feb. 6, 1968

3,367,224
ALIGNING AND POSITIONING DEVICE
Alphonse M. Thiel, Pasadena, Tex., assignor to the United States of America as represented by the Administrator of the National Aeronautics and Space Administration
Filed Dec. 1, 1965, Ser. No. 511,299
3 Claims. (Cl. 83—467)

ABSTRACT OF THE DISCLOSURE

Stacks of paper sheets may be held for repetitive cuts at an acute angle to the cutting blade of a paper cutting machine by a jig having guide arms positioned along adjacent edges of the paper stack, said guide arms being angularly adjustable with respect to a reference frame member.

The invention described herein may be manufactured and used by or for the Government of the United States of America for governmental purposes without the payment of any royalties thereon or therefor.

The present invention relates to cutting machinery and more particularly to a device for aligning and positioning material which is to be cut at an angle to the reference plate of the machine.

In order to facilitate the cutting of a plurality of sheets, such as paper or other material, it is a common expedient to stack the sheets, one on top of the other, until either the desired number or the cutting capability of the machine is reached. It is necessary, in so doing, to both align the sheets with respect to each other so as to achieve a neat and even cut and to position the aligned stack in appropriate relationship to the cutting knife prior to operation thereof. Heretofore these two steps have most often been accomplished by the operator manually aligning the sheets and positioning the stack under the knife. This is not only time consuming and dangerous to the operator's hands but is frequently ineffective in achieving aligned and accurate cuts. Moreover in cutting operations requiring the even alignment and cutting of a plurality of stacks, it is found that due to the difficulty of visually positioning subsequent stacks at exactly the same cutting angle as prior ones, the care and preparation for prior cuts is often nullified if an even cut is not achieved.

In addition to various hand methods for aligning and positioning the material to be cut, numerous guide tools disclosed in the prior art have been used. In general these guides are incapable of both aligning and positioning the sheets, particularly sheets having corner angles other than 90°. Also, even though aligned cuts may be made to an individual stack of sheets with these tools, it is found that due to their construction the cutting angle often slips when a series of stacks are cut, thus resulting in evenly cut but unalignable stacks.

Both the problems resulting from hand alignment and positioning methods and those associated with prior art devices are obviated by the invention disclosed herein. Briefly, the device comprises a cutting guide for use in aligning stacked sheets and for positioning the sheets beneath the cutter blade at consistently identical angles, regardless of the number of stacks to be cut. It is so constructed as to permit aligning and positioning without visual examination of the sheets, thus requiring negligible loading and unloading time by comparison to prior art hand methods. Movement of the operator's hands in the area of the cutter is unnecessary thereby avoiding possible injury. Also, despite its capability to act as guide and aligner for a wide range of angular cuts, the instant device is simple and economical to construct.

Other advantages and features of the invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a perspective view of the invention as viewed from the top thereof showing the pivotal motion of the cutter;

FIG. 2 is a cross sectional view of FIG. 1 along the plane 2—2 thereof;

FIG. 3 is a modification of FIG. 1 wherein one of the guide arms is pivotable; and FIG. 4 shows the pivotable guide arm of FIG. 2 removed from the assembly.

With reference to FIGS. 1 and 2 there is shown the preferred form of the invention which comprises an elongated backstop member 3 to which is affixed, as by welding, the circular base 5. The base and backstop member may be made of aluminum, steel, or other material characterized by its rigidity and durability under repeated use. The rear wall 7 of the backstop should be machined in appropriately flat form so as to fit evenly against the mating backstop 4 of the cutting machine or press. Extending through the center of circular base 5 is a hole 9 adapted to receive the axle 11 of the pivotal guide. The pivotal guide includes upper and lower plate portions 15, 17 respectively which are adapted to lie upon each the upper and lower surface of circular base 5. Both the upper and lower plate portions contain an aligned circular hole 19 which is coaxially disposed with respect to base hole 9. The aforementioned axle 11 is inserted into the aligned holes 19, 9 and extends approximately to the surface of the upper and lower plate portions, thereby providing a pivotal axis for the guide with respect to backstop member 3.

Extending outwardly in perpendicular relation to each other from upper and lower plate portions 15, 17 are a pair of guide arms 21, 23 which have smooth interior surfaces for aligning the sheets. The arms may be formed as an integral piece or as removable extensions affixed to the upper and lower plate portions with screws 24, for example. The latter may be desirable should replacement become necessary as a result of damage during use. The height $a$ of these arms will be governed by the thickness and number of the sheets to be cut and by the stroke of the cutter. Their interior length $b$ may be as long as necessary to easily align the sheets being cut. It was found for example that arms approximately six inches long and two inches high were satisfactory for aligning and cutting 8½" by 10½" paper sheets.

There is provided in the upper plate portion 15 a locking means between the pivotal guide arms 21, 23 and base 5 so as to eliminate the necessity for holding them in position when an angular cut is made. This locking means consists of a pair of circular set-pin holes 25, 27 about ¼" in diameter at the approximate positions noted in FIG. 1. Cooperating locking holes 31, 33, 35 (the latter not shown) and 37, 39, 41 (the latter not shown) extend into the base 5 and should be of substantially the same diameter as set pin holes 25, 27. A locking member comprising an expanded knurled head portion 45 and male pin 47 of appropriate diameter is inserted into one of the set pin holes when aligned with one of the aforementioned locking holes. It is apparent that the particular set pin hole and cooperating lock hole used will depend on the angle at which the guide device is to be used and that therefore the specific number, relationship, and/or location of the various holes may be altered in accordance with the desired cutting angles.

Although angular cuts are made most generally on sheets having 90° corners, it is sometimes necessary to align and cut sheets not having this perpendicular edge. Since an individual guide device for each angle would be both expensive and cumbersome to use, a modified guide, incorporating all the advantages of the guide disclosed above and yet capable of aligning sheets having any corner angle is shown in FIGS. 3 and 4. This device is identical in most respects to that of FIG. 1 except that one arm is movable with respect to the other. It comprises a base guide arm 21 and pivotable guide arm 23. The base guide arm is constructed identically to the device of FIG. 1, in that it has upper and lower plate portions 15, 17 respectively. An aligned circular hole 19 extends through each the upper and lower plate portions and is adapted to receive an axis pin 11 in the manner previously described. A circular recess portion 63, 65 is provided in both the upper and lower plate portions internally of the base guide arm, see FIG. 4. A seating section 67 having circular bore 69 therethrough is formed intermediate the circular recesses. The pivotal guide arm 23 embodies circular mating portions 73, 75 separated by the cutout area 79 which is adapted to receive the seating section 67 of the base guide arm. Likewise recesses 63, 65 receive mating portions 73, 75 of the pivot arm. Although numerous locking arrangements may be provided for this arm, there is shown for exemplary purposes an aligned bore in both the circular mating portions 73, 75. The bore in lower portion 75 is threaded to receive locking lug 83. The locking lug similarly has a threaded end 85 which is inserted through bores 69 and 77 and clamps the mating portions 73, 75 against seat 67 when rotated. In this manner the arms may easily and quickly be adjusted and clamped at any one of an infinite number of angles, thus greatly enhancing the versatility of the device. In addition the angle of cut may be varied by mere adjustment of the aligned locking holes 31, 33, 37, and 39 with either of the pin holes 25, 27.

In operation, the cutting guide of the invention is preset at the desired angular cut. It is then loaded with the material 91 (FIG. 1) to be cut and slid by means of the movable backstop 4 to the appropriate distance from the cutting knife. After the cut is made, it is necessary only to reload and cut again, there being no necessity to reexamine the cutting angle of the arms. If the material being cut has no 90° corners, the arms may be set to receive the appropriate corner angle in accordance with the device described in FIGS. 3 and 4. Repeated cuts may then be accomplished by merely reloading the guide after every cut.

While the invention is shown in one general form and a single modification thereof in the drawings and specification, it is not desired to limit said invention to the specific forms shown, particularly since other locking means and pivoting arrangements, embodying the principles herein are possible. It will therefore be appreciated that each other forms of construction are contemplated to lie within the scope of the appended claims.

Having thus described the invention, what is claimed and desired to be secured by Letters Patent is:

1. A guide device for positioning stacks of sheet material to be cut with respect to a cutting blade comprising:
   a base member having a first side adapted to rest against a reference surface;
   said base member having salient means projecting from a side thereof opposite from said first side;
   said salient means having a journal means extending therethrough in a direction perpendicular to the plane of said sheet material;
   a plurality of aperture means in said salient portion disposed about the axis of said journal means at a predetermined radial distance therefrom each of said plurality of aperture means being arcuately separated from adjacent aperture means by a uniquely selected arcuate angle;
   plate means overlying said salient means and pivotally secured thereto to said journal means;
   at least one aperture means in said plate means at said predetermined radial distance from said journal axis;
   pin means for removable insertion into said plate and salient aperture means whereby said plate and salient means are relatively secured in a selective angular relationship; and
   a pair of guide arm means secured to said plate means, each arm of said pair being angularly disposed with respect to the other for receiving and aligning adjacent edges of stacked sheet material.

2. Apparatus as described in claim 1 wherein a first one of said pair of guide arm means is rigidly secured to said plate means;
   a second one of said pair of guide arm means being journally secured to said plate means about an axis positioned radially beyond the periphery of said salient means.

3. Apparatus as described by claim 2 wherein said second guide arm means is selectively rigidly secured to said plate means by axial clamp means, said clamp means extending co-axially with said axis positioned radially beyond said salient means periphery.

References Cited

UNITED STATES PATENTS

| | | | |
|---|---|---|---|
| 421,546 | 2/1890 | Brown | 269—319 X |
| 976,296 | 11/1910 | Robbins | 143—86 |
| 1,302,211 | 4/1917 | Pflange | 83—467 |
| 1,410,519 | 3/1922 | Stengel | 269—319 |

JAMES M. MEISTER, *Primary Examiner.*